(12) United States Patent
Ikeda et al.

(10) Patent No.: US 7,158,475 B1
(45) Date of Patent: Jan. 2, 2007

(54) TRANSMITTING APPARATUS AND METHOD AND PROVISION MEDIUM

(75) Inventors: Yasunari Ikeda, Kanagawa (JP); Tamotsu Ikeda, Tokyo (JP); Takahiro Okada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/936,337

(22) PCT Filed: Mar. 10, 2000

(86) PCT No.: PCT/JP00/01483

§ 371 (c)(1),
(2), (4) Date: Jan. 22, 2002

(87) PCT Pub. No.: WO00/55998

PCT Pub. Date: Sep. 21, 2000

(30) Foreign Application Priority Data

Mar. 12, 1999 (JP) .................................. 11-066637

(51) Int. Cl.
*H04J 11/00* (2006.01)
*H04J 3/06* (2006.01)
(52) U.S. Cl. ....................... 370/208; 370/350
(58) Field of Classification Search ............... 370/203, 370/208, 210, 350
See application file for complete search history.

(56) References Cited

U.S. PATENT DOCUMENTS

| | | | | | |
|---|---|---|---|---|---|
| 5,471,464 | A | * | 11/1995 | Ikeda | 370/203 |
| 5,506,836 | A | * | 4/1996 | Ikeda et al. | 370/203 |
| 5,812,523 | A | * | 9/1998 | Isaksson et al. | 370/208 |
| 6,088,327 | A | * | 7/2000 | Muschallik et al. | 370/210 |
| 6,091,702 | A | * | 7/2000 | Saiki | 370/203 |
| 6,226,337 | B1 | * | 5/2001 | Klank et al. | 375/367 |
| 6,314,083 | B1 | * | 11/2001 | Kishimoto et al. | 370/210 |
| 6,618,352 | B1 | * | 9/2003 | Shirakata et al. | 370/203 |
| 6,853,616 | B1 | * | 2/2005 | Kim et al. | 370/210 |
| 6,856,590 | B1 | * | 2/2005 | Okada et al. | 370/208 |
| 2005/0232217 | A1 | * | 10/2005 | Do et al. | 370/343 |

FOREIGN PATENT DOCUMENTS

| | | |
|---|---|---|
| JP | 7-283806 | 10/1995 |
| JP | 2957575 | 10/1999 |
| JP | 11-331121 | 11/1999 |
| JP | 2000-49744 | 2/2000 |

* cited by examiner

*Primary Examiner*—Chau Nguyen
*Assistant Examiner*—Hong Sol Cho
(74) *Attorney, Agent, or Firm*—Finnegan, Henderson, Farabow, Garrett & Dunner, L.L.P.

(57) ABSTRACT

Influence from an adjacent signal is prevented even if a guard band is not provided.

A phase comparison unit 21 compares a reference window signal input to a PLL circuit 4 and a window signal supplied from a frequency division circuit 22 and outputs the comparison result to an LPF 23. The LPF 23 extracts a low frequency component from the input signal and outputs the same to a voltage controlled oscillator 24. The signal output from the voltage controlled oscillator 24 is supplied as a clock to units of an OFDM modulation circuit 2 and, at the same time, supplied to the frequency division circuit 22. The frequency division circuit 22 divides the frequency of the supplied signal to thereby generate a new window signal and supplies the same to an IFFT unit 13. Further, the generated window signal is supplied to a PLL circuit 5. The PLL circuit 5 generates a clock for controlling a frequency modulation circuit 3 based on the supplied window signal.

9 Claims, 8 Drawing Sheets

FIG.4B OFDM TIME SIGNAL

FIG.4C FFT WINDOW PHASE

FIG.5B OFDM TIME SIGNAL

FIG.5C FFT WINDOW PHASE

[CONDITION 4] CARRIER INTERVAL BETWEEN CHANNELS IS WHOLE MULTIPLE OF CARRIER INTERVAL IN CHANNEL

TRANSMITTING APPARATUS AND METHOD AND PROVISION MEDIUM

TECHNICAL FIELD

The present invention relates to a transmitting apparatus and method and a provision medium for the same, more particularly relates to a transmitting apparatus and method for transmitting a signal which can correctly detect a desired signal even without providing a guard band usually provided for preventing interference from an adjacent signal and a provision medium for the same.

BACKGROUND ART

The OFDM (orthogonal frequency division multiplexing) transmission system has tolerance against multipath interference, so is known as a transmission system suitable for digital transmission using terrestrial waves. The OFDM transmission system is being employed as a provisional system by the Japanese Telecommunications Technology Council for its digital terrestrial television broadcast system (hereinafter referred to as the "wideband ISDB-T" system) and digital terrestrial radio system (hereinafter referred to as the "narrowband ISDB-T system").

At the start of digital broadcasts, it can be considered that there will be a duration of coexistence with the analog broadcasts already in service. Also, it is proposed to abolish analog broadcasts after the shift to digital broadcasts has sufficiently advanced. For the duration of coexistence of analog broadcasts and digital broadcasts, it is necessary to give sufficient consideration so that the digital broadcasts do not interfere with the already existing analog broadcasts. In the wideband ISDB-T system comprised by 13 segments, as shown in FIG. 1, one segment's bandwidth (about 429 kHz) is provided as a guard band to separate upper and lower adjacent channels (so that there is no interference from an adjacent channel).

Figure 1:
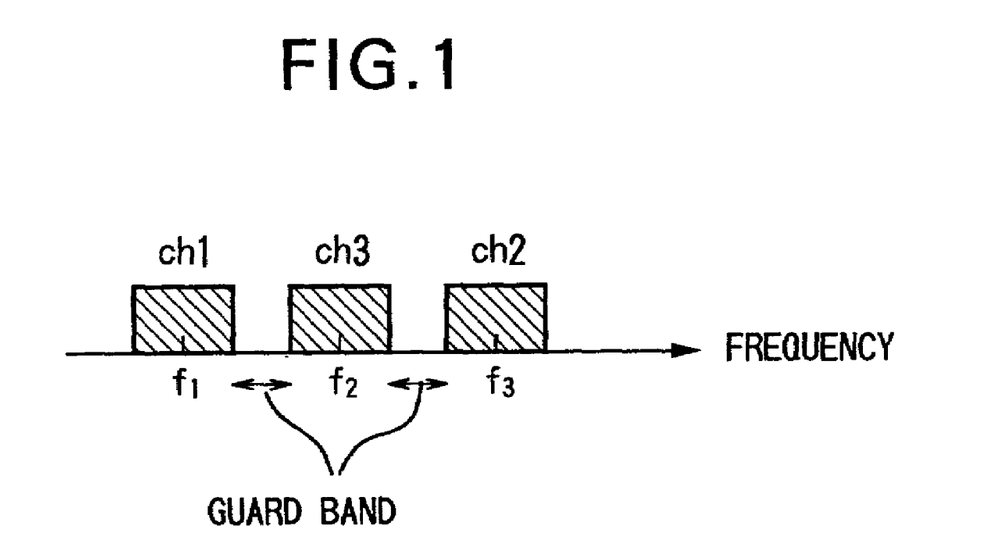
FIG. 1 is a view explaining a guard band.

FIG. 1 shows a case where such consideration is given by providing a guard band between each two adjacent channels among a channel 1 (ch1) having a center frequency $f_1$, ch2 having a center frequency $f_2$, and ch3 having a center frequency $f_3$.

However, the provision of guard bands as mentioned above means a reduction of the efficiency of use of the frequency, so is not preferred from the viewpoint of effective utilization of the frequency. Also, when the analog broadcasts are abolished and digital broadcasts are shifted to, it is desired that there be no interference between adjacent digital signals even if no guard bands are provided.

DISCLOSURE OF THE INVENTION

The present invention was made in consideration with such a circumstance and has as an object thereof to enable a desired signal to be obtained without receiving interference from an adjacent signal even without providing a guard band.

A transmitting apparatus is characterized by including an inputting means for inputting a first window signal serving as a reference, a first generating means for generating a first clock and a second window signal from the first window signal input by the inputting means, a modulating means for modulating an OFDM signal in accordance with the information by using the first clock and the second window signal, and a second generating means for generating, from the second window signal, a second clock for controlling a transmission interval of OFDM signals so that a carrier interval between one OFDM signal and an adjacent OFDM signal becomes a whole multiple of the interval of carriers adjacent to each other in the OFDM signal.

A transmission method is characterized by including an input step of inputting a first window signal serving as a reference, a first generation step of generating a first clock and a second window signal from the first window signal input at the input step, a modulation step of modulating an OFDM signal in accordance with information by using the first clock and the second window signal, and a second generation step of generating, from the second window signal, a second clock for controlling a transmission interval of OFDM signals so that a carrier interval between one OFDM signal and an adjacent OFDM signal becomes a whole multiple of the interval of carriers adjacent to each other in the OFDM signal.

A provision medium is characterized in that it provides, to a transmitting apparatus, a computer readable program for making it run processing including an input step of inputting a first window signal serving as a reference, a first generation step of generating a first clock and a second window signal from the first window signal input at the input step, a modulation step of modulating an OFDM signal in accordance with information by using the first clock and the second window signal, and a second generation step of generating, from the second window signal, a second clock for controlling a transmission interval of OFDM signals so that a carrier interval between one OFDM signal and an adjacent OFDM signal becomes a whole multiple of the interval of carriers adjacent to each other in the OFDM signal.

A transmitting apparatus is characterized by including an inputting means for inputting an OFDM signal serving as the reference, a first generating means for generating a window signal and a first clock by demodulating the OFDM signal input by the inputting means, a modulating means for modulating an OFDM signal in accordance with information by using the window signal and first clock generated by the first generating means, and a second generating means for generating, from the window signal generated by the first generating means, a second clock for controlling a transmission interval of OFDM signals generated by the modulating means so that a carrier interval between one OFDM signal and an adjacent OFDM signal becomes a whole multiple of the interval of carriers adjacent to each other in the OFDM signal.

A transmission method is characterized by including an input step of inputting an OFDM signal serving as a reference, a first generation step of generating a window signal and a first clock by demodulating the OFDM signal input at the input step, a modulation step of modulating an OFDM signal in accordance with information by using the window signal and first clock generated at the first generation step, and a second generation step of generating, from the window signal generated at the first generation step, a second clock for controlling a transmission interval of OFDM signals generated at the modulation step so that a carrier interval between one OFDM signal and an adjacent OFDM signal becomes a whole multiple of the interval of carriers adjacent to each other in the OFDM signal.

A provision medium is characterized in that it provides, to a transmitting apparatus, a computer readable program for making it run processing including an input step of inputting an OFDM signal serving as a reference, a first generation step of generating a window signal and a first clock by demodulating the OFDM signal input at the input step, a modulation step of modulating an OEDM signal in accordance with information by using the window signal and first clock generated at the first generation step, and a second generation step of generating, from the window signal generated at the first generation step, a second clock for controlling a transmission interval of OFDM signals generated at the modulation step so that a carrier interval between one OFDM signal and an adjacent OFDM signal becomes a whole multiple of the interval of carriers adjacent to each other in the OFDM signal.

A transmitting apparatus is characterized by including an inputting means for inputting a window signal and a first clock serving as a reference, a modulating means for modulating an OFDM signal in accordance with information by using the window signal and first clock input by the inputting means, and a generating means for generating, from the window signal input by the inputting means, a second clock for controlling a transmission interval of OFDM signals generated by the modulating means so that a carrier interval between one OFDM signal and an adjacent OFDM signal becomes a whole multiple of the interval of carriers adjacent to each other in the OFDM signal.

A transmission method is characterized by including an input step of inputting a window signal and first clock serving as a reference, a modulation step of modulating an OFDM signal in accordance with information by using the window signal and first clock input at the input step, and a generation step of generating, from the window signal input at the input step, a second clock for controlling a transmission interval of OFDM signals generated by the modulating means so that a carrier interval between one OFDM signal and an adjacent OFDM signal becomes a whole multiple of the interval of carriers adjacent to each other in the OFDM signal.

A provision medium is characterized in that it provides, to a transmitting apparatus, a computer readable program for making it run processing including an input step of inputting a window signal and first clock serving as a reference, a modulation step of modulating an OFDM signal in accordance with information by using the window signal and first clock input at the input step, and a generation step of generating, from the window signal input at the input step, a second clock for controlling a transmission interval of OFDM signals generated by the modulating means so that a carrier interval between one OFDM signal and an adjacent OFDM signal becomes a whole multiple of the interval of carriers adjacent to each other in the OFDM signal.

In a first exemplary embodiment, in the transmitting apparatus, transmission method, and the provision medium, the first clock and the second window signal are generated from the input first window signal, an OFDM signal is modulated in accordance with information by using the first clock and the second window signal, and the second clock for controlling the transmission interval of OFDM signals so that the carrier interval between one OFDM signal and an adjacent OFDM signal becomes a whole multiple of the interval of the carriers adjacent to each other in the OFDM signal is generated from the second window signal.

In a second exemplary embodiment, in the transmitting apparatus, transmission method, and the provision medium, the window signal and the first clock are generated by demodulating the input OFDM signal, an OFDM signal is modulated in accordance with information by using the generated window signal and first clock, and the second clock for controlling the transmission interval of OFDM signals so that the carrier interval between one OFDM signal and an adjacent OFDM signal becomes a whole multiple of the interval of the carriers adjacent to each other in the OFDM signal is generated from the generated window signal.

In a third exemplary embodiment, in the transmitting apparatus, transmission method, and the provision medium, an OFDM signal is modulated in accordance with information by using the input window signal and first clock, and a second clock for controlling the transmission interval of OFDM signals so that the carrier interval between one OFDM signal and an adjacent OFDM signal becomes a whole multiple of the interval of the carriers adjacent to each other in the OFDM signal is generated from the input window signal.

BEST MODE FOR WORKING THE INVENTION

Figure 2:
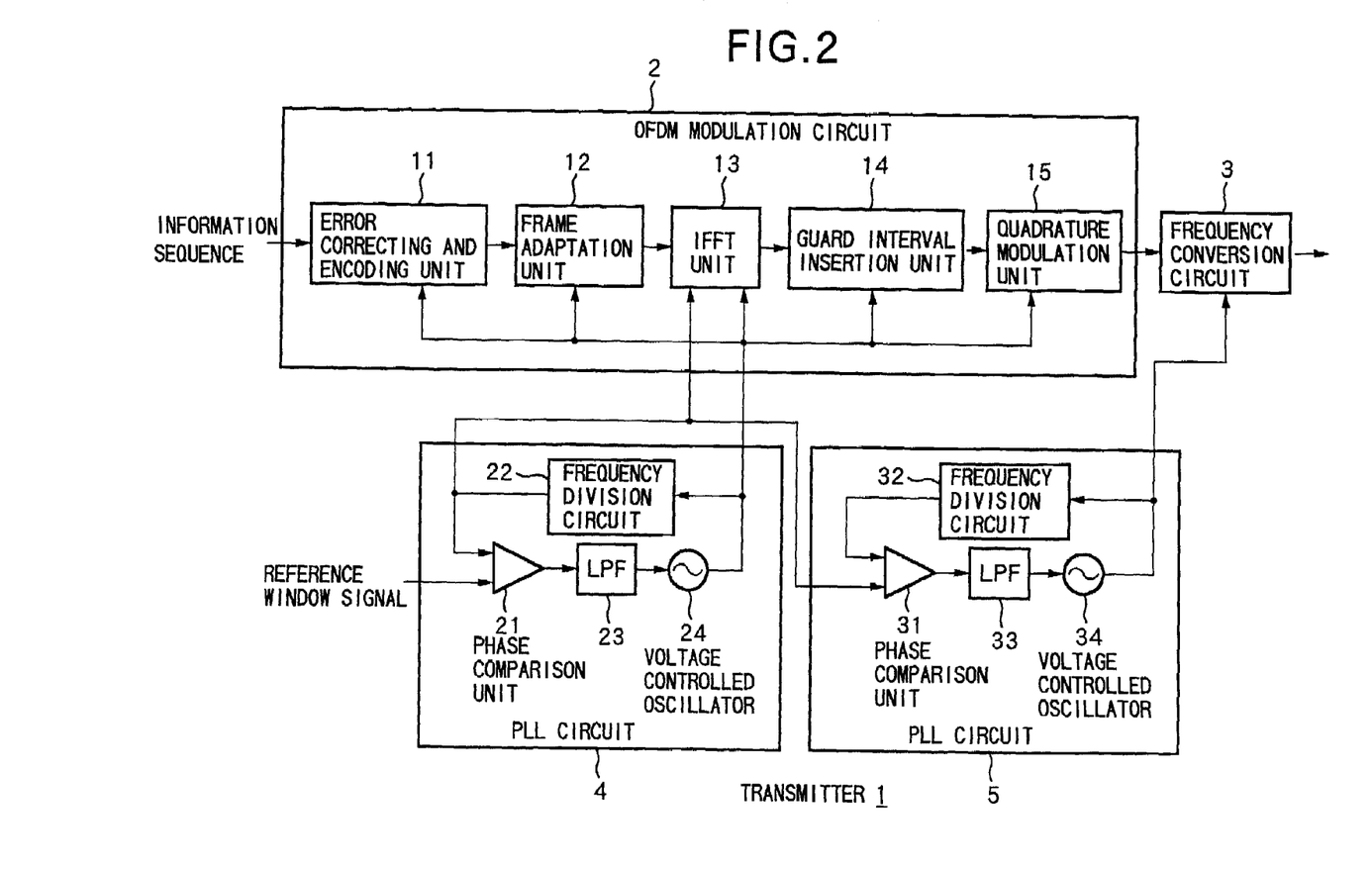
FIG. 2 is a block diagram of the configuration of an embodiment of a transmitter to which the present invention is applied.

FIG. 2 is a block diagram of an embodiment of a transmitter to which the present invention is applied. A series of information input to an OFDM modulation circuit 2 of a transmitter 1 is corrected for error and encoded by an error correcting and encoding unit 11 and output to a frame adaptation unit 12. The frame adaptation unit 12 builds frames each comprised of synchronization use symbols, service identification use symbols, and information transmission use symbols. The signal formed into frames is input to an IFFT (inverse fast Fourier transform) unit 13 where it is subjected to an inverse Fourier transform (OFDM modulated) and then output to a guard interval insertion unit 14.

Figure 3:
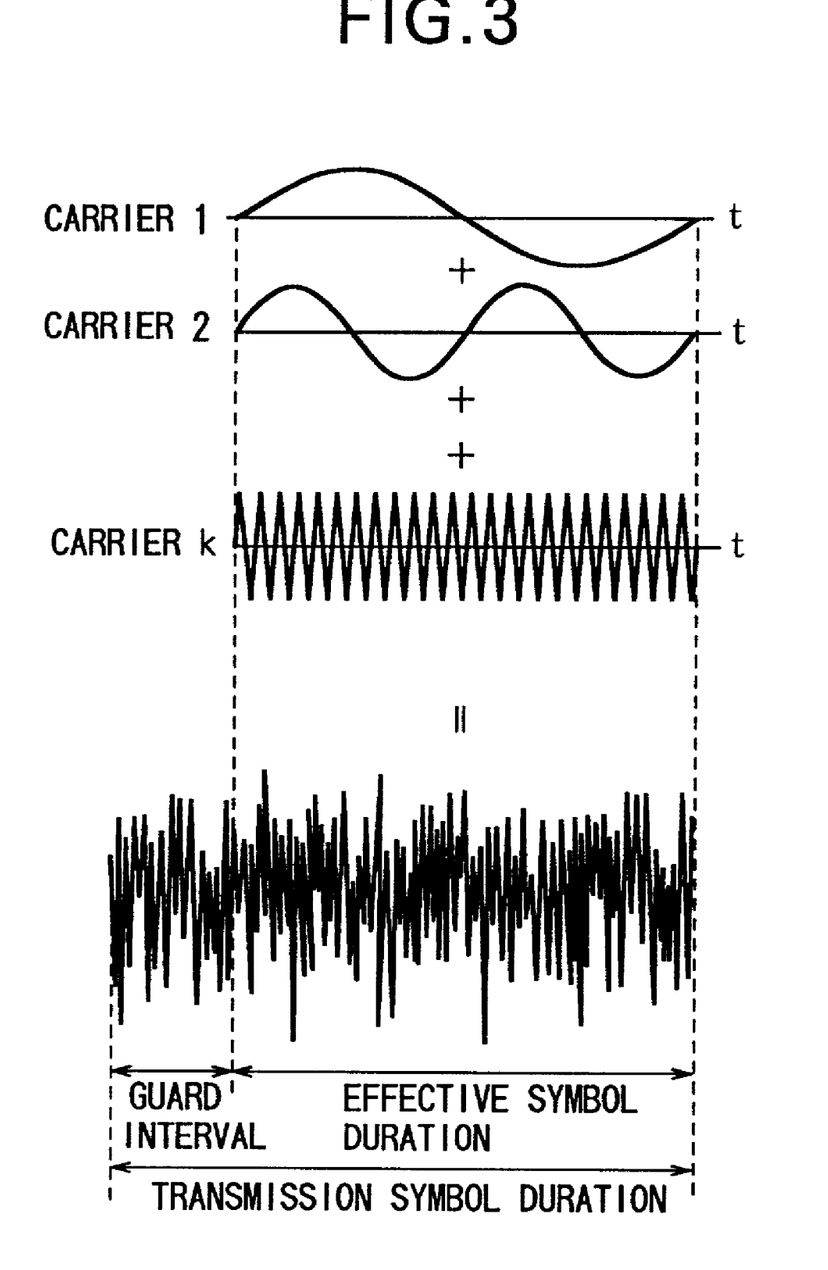
FIG. 3 is a view explaining a guard interval.

The guard interval insertion unit 14 inserts a guard interval to the input signal. In the OFDM modulation scheme, as shown in FIG. 3, a transmission signal is generated by combining carriers 1 through k as modulated waves modulated by using for example 64 QAM (quadrature amplitude modulation). The transmission symbol duration is comprised by the guard interval and an effective symbol duration. The guard interval is the signal duration provided for reducing the influence of multipath interference (ghost) and is obtained by cycling and repeating part of a signal waveform of the effective symbol duration.

The signal inserted with the guard interval by the guard interval insertion unit 14 is input to an quadrature modulation unit 15 where it is orthogonally modulated and then output to a frequency conversion circuit 3. The frequency conversion circuit 3 converts the input signal to the frequency for transmission and transmits the same from a not illustrated antenna.

A PLL (phase locked loop) circuit 4 generates a window signal and clock. A phase comparison unit 21 receives as input a window signal serving as a reference and a window signal output from a frequency division circuit 22. The phase comparison unit 21 compares the phases of the two input window signals and outputs the result to an LPF (low pass filter) 23. The LPF 23 extracts a low frequency component of the input signal and outputs the same to a voltage controlled oscillator 24. The voltage controlled oscillator 24 generates a clock for controlling the OFDM modulation circuit 2 from the input signal and provides the same to the units of the OFDM modulation circuit 2.

The clock output from the voltage controlled oscillator 24 is also supplied to the frequency division circuit 22 where it is divided in frequency. The frequency division ratio of the frequency division circuit 22 is set according to the carrier interval of the OFDM signal, that is, the number of points of IFFT and the guard interval length. The clock divided in frequency by the frequency division circuit 22 is supplied as a window signal to the IFFT unit 13 and, at the same time, fed back to the phase comparison unit 21. In this way, the PLL circuit 4 generates a clock and window signal synchronous to the window signal serving as a reference.

The window signal generated by the PLL circuit 4 is also input to a phase comparison unit 31 of a PLL circuit 5. The PLL circuit 5 compares the phases of the window signal output from a frequency division circuit 32 and the input window signal from the PLL circuit 4 by the phase comparison unit 31 in the same way as the PLL circuit 4, extracts the low frequency component from the result by an LPF 33, and generates a clock by a voltage controlled oscillator 34. The clock generated by the PLL circuit 5 is supplied to the frequency conversion circuit 3.

The transmitter 1 mentioned above satisfies the following four conditions for adjacent OFDM signals (between channels).

[Condition 1] The carrier intervals are equal (effective symbol duration are equal).

[Condition 2] The symbol lengths (guard interval lengths) are equal.

[Condition 3] The IFFT window phases are equal.

[Condition 4] The interval between the carrier at an end portion of the OFDM signal and the carrier of the adjacent OFDM signal nearest that is a whole multiple of the carrier interval in each OFDM signal.

By satisfying all of these four conditions, since at least adjacent OFDM signals satisfy the orthogonal condition, it becomes possible on a receiver side to eliminate any influence from a signal adjacent to the desired signal and obtain only the desired signal even if no guard interval is provided. Below, the reason for that will be explained.

Figure 4A:
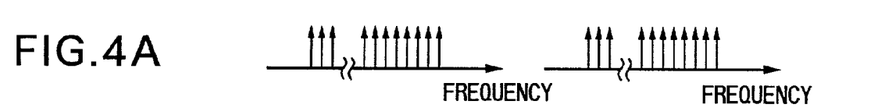
FIGS. 4A to 4D are views explaining a window phase.
Figure 4B:
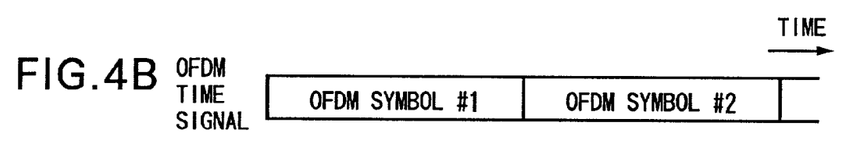

An explanation will be made of an output of a FFT (fast Fourier transform) at the time of OFDM demodulation by a correct window phase at the receiver side by referring to FIGS. 4A to 4D. First, on the transmission side, an IFFT operation (OFDM modulation) is applied to the signal as shown in FIG. 4A, and OFDM symbols #1, #2, . . . as shown in FIG. 4B are generated and transmitted to the receiver side. The carriers in symbols of the OFDM symbols obtained by the IFFT operation are orthogonal to each other. For this reason, no interference of the carriers in the OFDM symbols occurs.

Figure 4C:
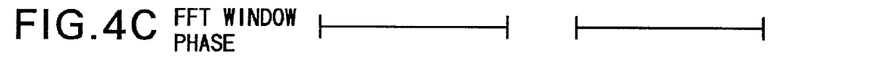
Figure 4D:
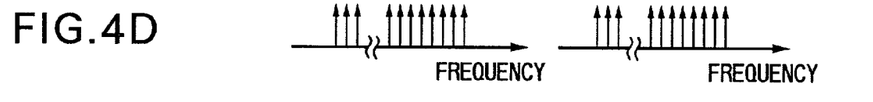

The receiver side applies an FFT operation (OFDM demodulation) to the transmitted OFDM symbols as shown in FIG. 4B by using the FFT window phase (window coincident with the effective symbol duration) having an adequate phase as shown in FIG. 4C and obtains a signal similar to the transmitted signal (FIG. 4A) as shown in FIG. 4D. In this way, when demodulating by the correct FFT window phase, carriers are orthogonal, so the phases and frequencies of the carriers are correctly detected.

Figure 5A:
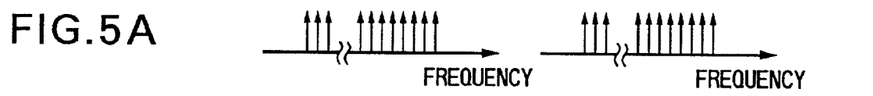
FIGS. 5A to 5D are views explaining a window phase.
Figure 5B:
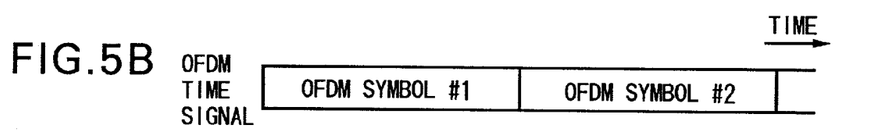
Figure 5C:
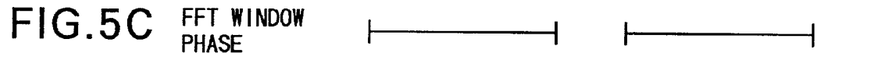
Figure 5D:
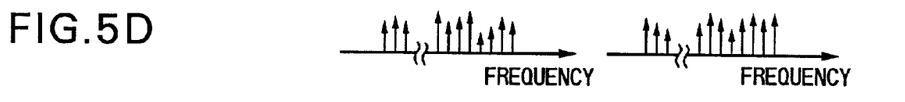

However, as shown in FIGS. 5A to 5D, if demodulating using an FFT window phase having an incorrect phase, the carriers are mixed with each other, so the correct signal cannot be detected. Namely, where the FFT window phase crosses over two OFDM symbols as shown in FIG. 5C, the carrier component of each symbol will flow into the carrier component of the other symbol, in other words, the orthogonal condition is no longer satisfied, so an erroneous signal different from the transmitted signal (FIG. 5A) is detected as shown in FIG. 5D.

Due to the above, the FFT window phases must be equal. Therefore, at the transmission side, the condition 3 that the IFFT window phases be equal is derived. However, even if the window phases are equal, if the transmission symbol duration have different lengths depending on the symbols, the signal of an adjacent symbol will flow into the signal of the desired symbol. Accordingly, it is necessary to make the transmission symbol duration equal. Therefore, the condition 1 that the intervals between effective symbols be equal and the condition 2 that the guard interval lengths be equal are derived.

Figure 6A:
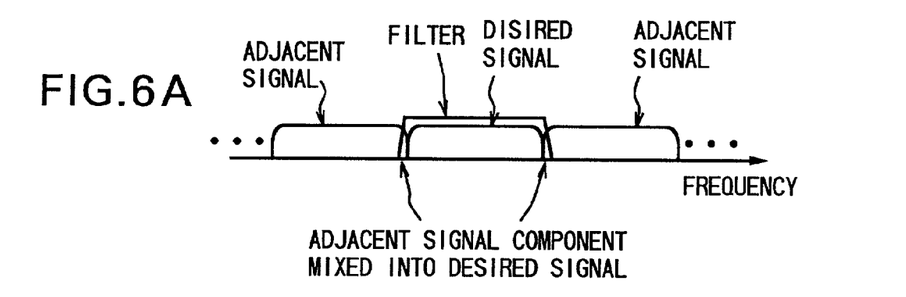
FIGS. 6A and 6B are views explaining a filter.
Figure 6B:
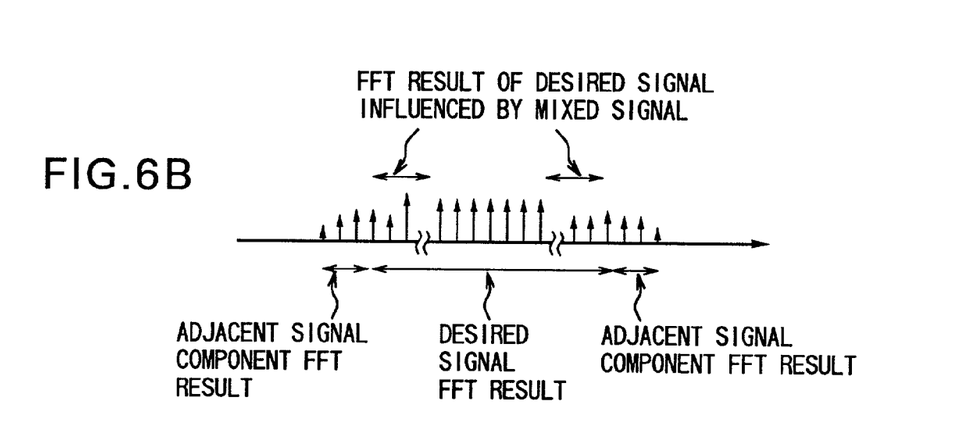

When adjacent OFDM signals are transmitted while arranged close, the reception side uses a sharp filter to remove the signals adjacent to the desired signal. However, the adjacent signals leak in due to the filter, so the correct signal cannot be obtained. Namely, the signal obtained by filtering the reception signal as shown in FIG. 6A, extracting the desired signal, and applying an FFT to that extracted signal is affected by the adjacent signal as shown in FIG. 6B, so is not correctly demodulated.

The demodulated signal is affected by the signal failed to be eliminated by the filter leaking into the desired signal in this way when the leaked signal and the desired signal are not orthogonal. There is no influence exerted upon the desired signal when the leaked signal and the desired signal are orthogonal. Accordingly, if the adjacent signal and the desired signal are made orthogonal, it becomes possible to correctly detect the desired signal free from the influence of the adjacent signal. As the condition for the adjacent signal and desired signal being orthogonal, the condition 4 that the carrier interval of the nearest carriers become a whole multiple of each OFDM signal carrier interval is derived.

Figure 7:
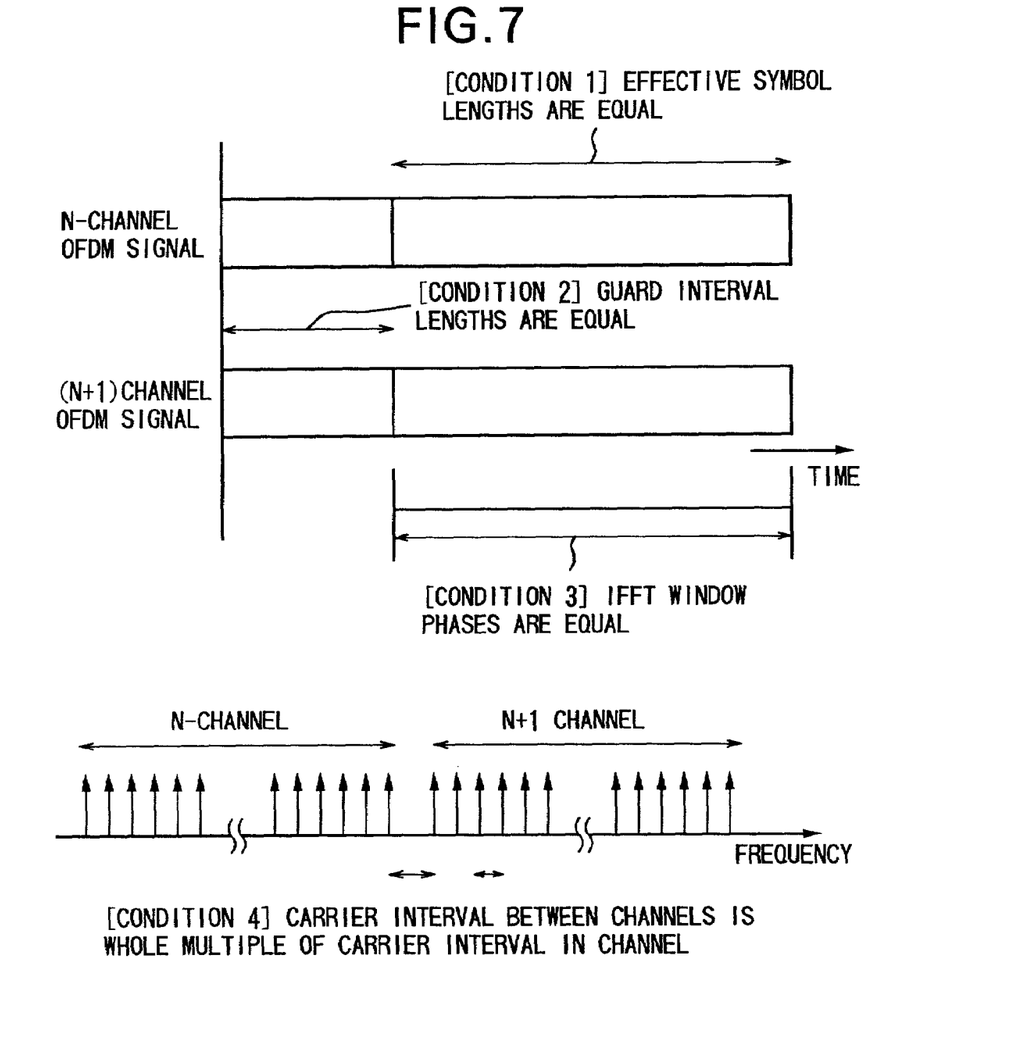
FIG. 7 is a view explaining conditions 1 through 4.

As shown in FIG. 7, in an N-channel OFDM signal and an adjacent N+1 channel OFDM signal, by satisfying all of the condition 1 that the effective symbol lengths thereof be equal, the condition 2 that the guard lengths be equal, the condition 3 that the IFFT window phases be equal, and the condition 4 that the carrier interval between channels become a whole multiple of the carrier interval in a channel, it becomes possible to detect the signal of the desired channel free from influence from the signals of the adjacent channel even if no guard band is provided between the channel N and the channel N+1.

In the transmitter 1 shown in FIG. 2, the PLL circuit 4 operates so as to satisfy the conditions 1 through 3, and the PLL circuit 5 operates so as to satisfy the condition 4. Namely, by generating the window signal and clock of IFFT to be used by the IFFT unit 13 synchronous to the reference window signal input to the phase comparison unit 21 of the PLL circuit 4, the conditions 1 through 3 are satisfied. Further, the IFFT window signal (corresponding to the interval of carriers in the OFDM signal) to be supplied to the IFFT operation unit 13 is supplied as a reference signal to the PLL circuit 5 for generating the carrier (RF signal) to be supplied to the frequency conversion circuit 3, so it becomes possible to generate the OFDM signal of the RF signal band while correctly keeping the OFDM carrier interval with the adjacent channel, that is, satisfy the condition 4.

Figure 8:
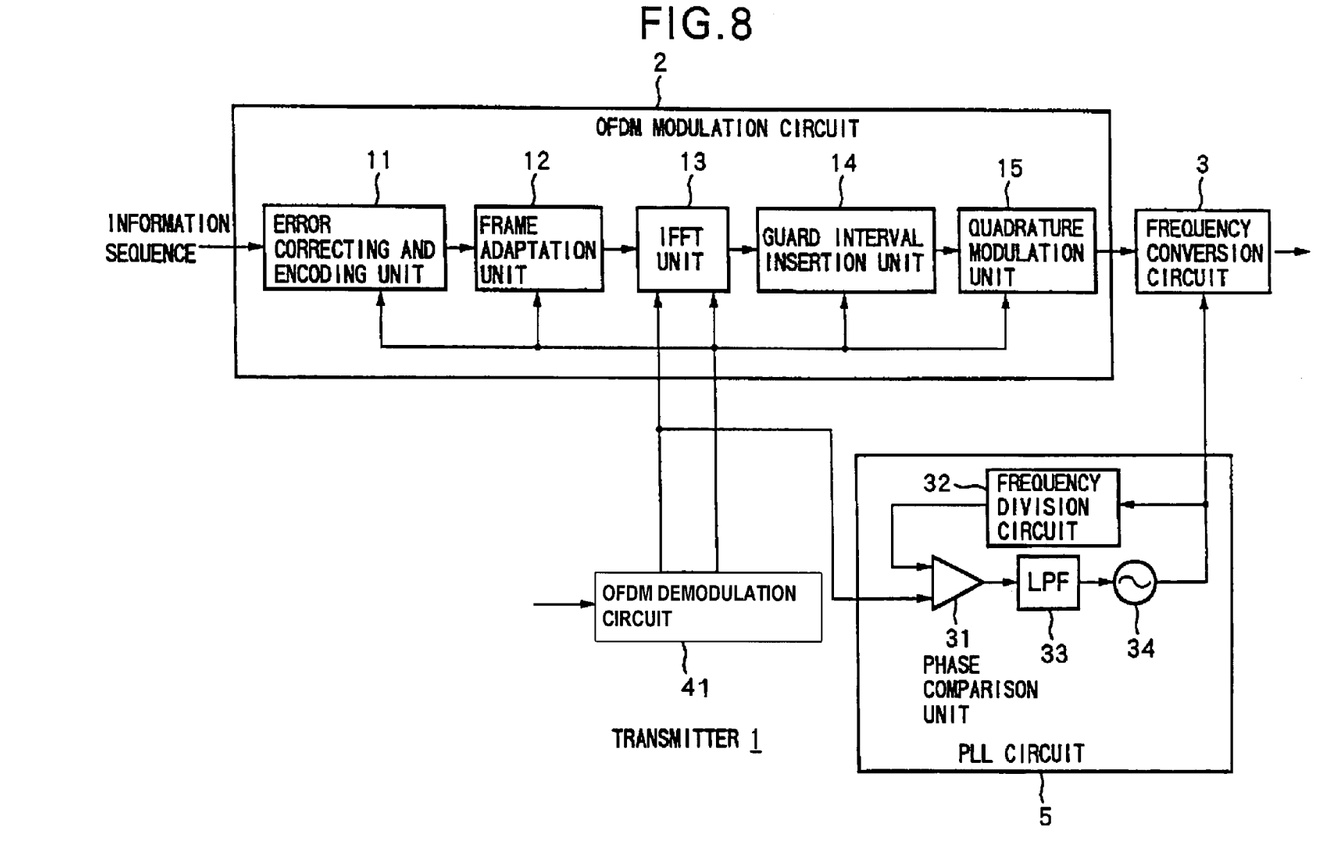
FIG. 8 is a block diagram of another configuration of the transmitter 1.

FIG. 8 is a block diagram of another configuration of the transmitter 1. The configuration of the transmitter 1 shown in FIG. 8 is one in which the PLL circuit 4 of the transmitter 1 shown in FIG. 2 is replaced by an OFDM demodulation circuit 41. The OFDM demodulation circuit 41 receives as input an OFDM signal serving as the reference and demodulates the OFDM signal to generate the window signal and clock. The transmitter 1 performs OFDM modulation by using the generated window signal and clock. By generating a new window signal and clock based on the input OFDM signal, the above conditions 1 through 3 are satisfied. Further, the carrier interval of signals to be transmitted is controlled based on the generated window signal, so also the condition 4 is satisfied.

Figure 9:
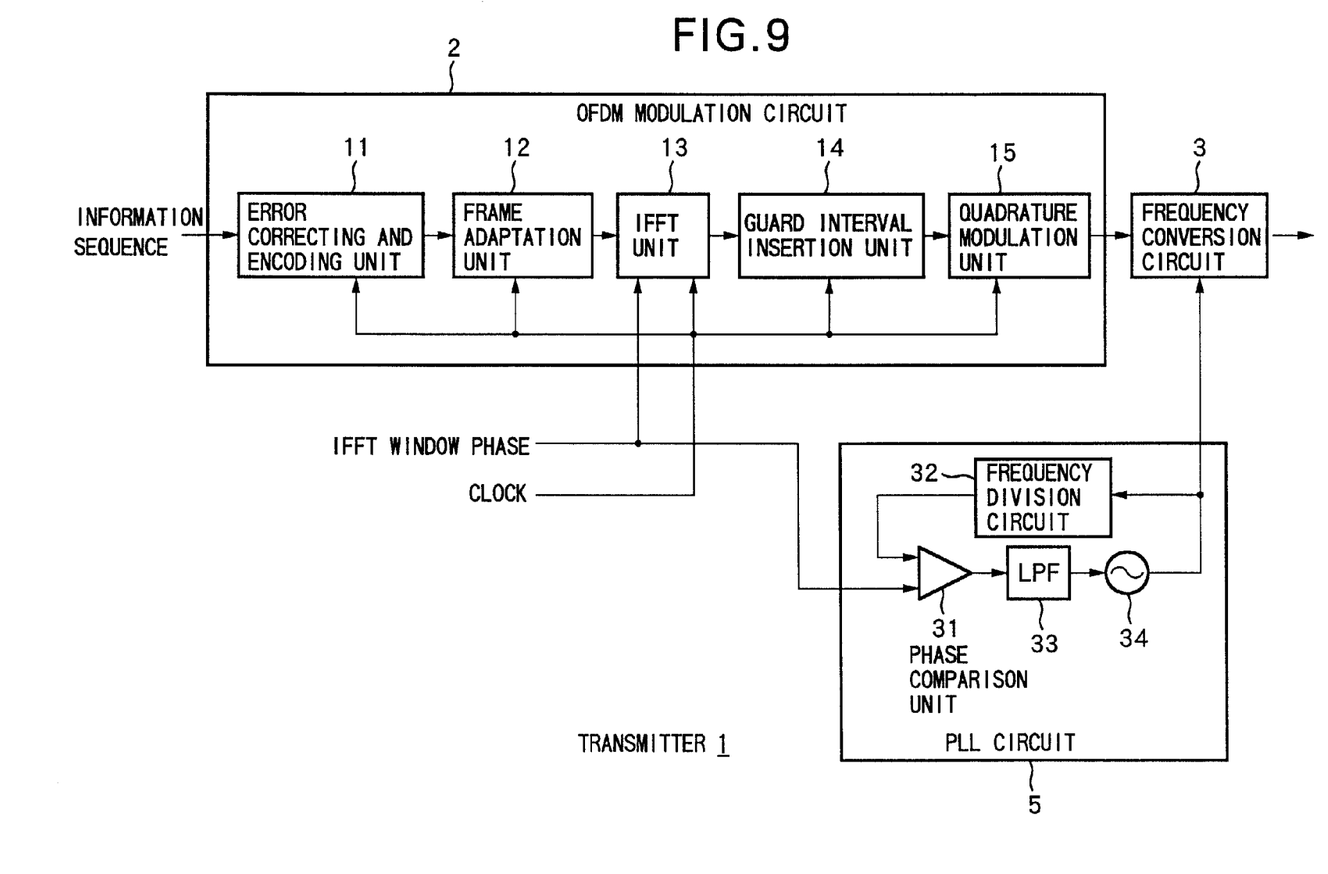
FIG. 9 is a block diagram of still another configuration of the transmitter 1.

FIG. 9 is a block diagram of still another configuration of the transmitter 1. In the configuration of the transmitter 1 shown in FIG. 9, the window signal and clock generated by the PLL circuit 4 of the transmitter 1 shown in FIG. 2 are supplied from a not illustrated other device. The OFDM modulation circuit 2 performs the IFFT operation by using the supplied window signal. Further, the OFDM modulation device 2 is controlled by the supplied clock. Then, the clock for controlling the frequency conversion circuit 3 is generated from the supplied window signal by the PLL circuit 5. By setting the window signal and clock supplied so as to satisfy the conditions 1 through 3, the conditions 1 through 3 are satisfied. Further, the carrier interval of signals transmitted is controlled based on the supplied window signal, so also the condition 4 is satisfied.

In this way, in the transmitting apparatus to which the present invention is applied, it becomes possible to transmit a signal enabling the desired signal to be detected free from the influence of an adjacent signal even if no guard band is provided, in other words, where the adjacent signals are orthogonal to each other.

In the present specification, the provision medium for providing the user with a computer program for executing the processing includes, other than information storage media such as a magnetic disc and a CD-ROM, the medium of transmission over a network such as the Internet or a digital satellite.

Capability of Utilization in Industry

As described above, according to the first exemplary transmitting apparatus, transmission method, and provision medium, since the first clock and the second window signal are generated from the input first window signal, the OFDM signal is modulated in accordance with information by using the first clock and the second window signal, and the second clock for controlling the transmission interval of OFDM signals so that the carrier interval between one OFDM signal and an adjacent OFDM signal becomes a whole multiple of the interval of the carriers adjacent to each other in the OFDM signal is generated from the second window signal, it becomes possible to obtain the desired signal free from the influence of an adjacent signal even if no guard band is provided.

according to the second exemplary transmitting apparatus, transmission method, and provision medium, since the window signal and the first clock are generated by demodulating the input OFDM signal, the OFDM signal is modulated in accordance with information by using the generated window signal and first clock, and the second clock for controlling the transmission interval of OFDM signals so that the carrier interval between one OFDM signal and an adjacent OFDM signal becomes a whole multiple of the interval of the carriers adjacent to each other in the OFDM signal is generated from the generated window signal, it becomes possible to obtain the desired signal free from the influence of an adjacent signal even if no guard band is provided.

according to the third exemplary transmitting apparatus, transmission method, and provision medium, since the OFDM signal is modulated in accordance with information by using the input window signal and first clock and the second clock for controlling the transmission interval of OFDM signals so that the carrier interval between one OFDM signal and an adjacent OFDM signal becomes a whole multiple of the interval of the carriers adjacent to each other in the OFDM signal is generated from the input window signal, it becomes possible to obtain the desired signal free from the influence of an adjacent signal even if no guard band is provided.

The invention claimed is:

1. A transmitting apparatus for orthogonal frequency division multiplexing ("OFDM") modulating and transmitting predetermined information, said transmitting apparatus comprising:

first generating means for inputting a first window signal serving as a reference and for generating a clock signal and a second window signal in accordance with the first window signal;

modulating means for modulating an OFDM signal in accordance with the information by using the clock signal and the second window signal;

second generating means for generating a predetermined radio frequency ("RF") signal in accordance with the second window signal; and frequency conversion means for converting frequencies of the OFDM signal based on the RF signal so that a carrier interval between adjacent channels becomes a whole multiple of the interval between carriers adjacent to each other within a channel.

2. A transmission method for orthogonal frequency division multiplexing ("OFDM") modulating and transmitting predetermined information, said transmission method comprising:

an input step of inputting a first window signal serving as a reference;

a first generation step of generating a clock signal and a second window signal in accordance with the first window signal input at the input step;

a modulation step of modulating an OFDM signal in accordance with the information by using the clock signal and the second window signal;

a second generation step of generating a predetermined radio frequency ("RF") signal in accordance with the second window signal; and a frequency conversion step of converting frequencies of the OFDM signal based on the RF signal so that a carrier interval between adjacent channels becomes a whole multiple of the interval between carriers adjacent to each other within a channel.

3. A computer readable medium having a program for causing a transmitting apparatus for orthogonal frequency division multiplexing ("OFDM") modulating and transmitting predetermined information to run processing, the processing comprising:

an input step of inputting a first window signal serving as a reference;

a first generation step of generating a clock signal and a second window signal in accordance with the first window signal input at the input step;

a modulation step of modulating an OFDM signal in accordance with the information by using the clock signal and the second window signal;

a second generation step of generating a predetermined radio frequency ("RF") signal in accordance with the second window signal; and a frequency conversion step of converting frequencies of the OFDM signal based on the RF signal so that a carrier interval between adjacent channels becomes a whole multiple of the interval between adjacent carriers within a channel.

4. A transmitting apparatus for orthogonal frequency division multiplexing ("OFDM") modulating and transmitting predetermined information, said transmitting apparatus comprising:

first generating means for demodulating an OFDM signal serving as a reference and for generating a window signal and a clock signal;

modulating means for modulating an OFDM signal in accordance with the information by using the window signal and the clock signal generated by the first generating means;

second generating means for generating a predetermined radio frequency ("RF") signal in accordance with the window signal; and frequency conversion means for converting frequencies of the OFDM signal based on the RF signal so that a carrier interval between adjacent channels becomes a whole multiple of the interval between carriers adjacent to each other within a channel.

5. A transmission method for orthogonal frequency division multiplexing ("OFDM") modulating and transmitting predetermined information, said transmission method comprising:

an input step of inputting an OFDM signal serving as a reference;

a first generation step of demodulating the OFDM signal input in the input step and generating a window signal and a clock signal;

a modulation step of modulating the OFDM signal in accordance with the information by using the window signal and the clock signal;

a second generation step of generating a predetermined radio frequency ("RF") signal in accordance with the window signal; and a frequency conversion step of converting frequencies of the OFDM signal based on the RF signal so that a carrier interval between adjacent channels becomes a whole multiple of the interval between carriers adjacent to each other within a channel.

6. A computer readable medium having a program for causing a transmitting apparatus for orthogonal frequency division multiplexing ("OFDM") modulating and transmitting predetermined information to run processing, the processing comprising:

an input step of inputting an OFDM signal serving as a reference;

a first generation step of demodulating the OFDM signal input in the input step and generating a window signal and a clock signal;

a modulation step of modulating the OFDM signal in accordance with the information by using the window signal and the clock signal;

a second generation step of generating a predetermined radio frequency ("RF") signal in accordance with the window signal; and a frequency conversion step of converting frequencies of the OFDM signal based on the RF signal so that a carrier interval between adjacent channels becomes a whole multiple of the interval between carriers adjacent to each other within a channel.

7. A transmitting apparatus for orthogonal frequency division multiplexing ("OFDM") modulating and transmitting predetermined information, said transmitting apparatus comprising:

modulating means for inputting a window signal and a clock signal serving as a reference and modulating an OFDM signal in accordance with the information by using the window signal and the clock signal;

generating means for generating a predetermined radio frequency ("RF") signal in accordance with the window signal; and frequency conversion means for converting frequencies of the OFDM signal based on the RF signal so that a carrier interval between adjacent channels becomes a whole multiple of the interval between carriers adjacent to each other within a channel.

8. A transmission method for orthogonal frequency division multiplexing ("OFDM") modulating and transmitting predetermined information, said transmission method comprising:

an input step of inputting a window signal and a clock signal serving as a reference;

a modulation step of modulating an OFDM signal in accordance with the information by using the window signal and the clock signal input at the input step;

a generation step of generating a predetermined radio frequency ("RF") signal in accordance with the window signal; and a frequency conversion step of converting frequencies of the OFDM signal based on the RF signal so that a carrier interval between adjacent channels becomes a whole multiple of the interval between carriers adjacent to each other within a channel.

9. A computer readable medium having a program for causing a transmitting apparatus for orthogonal frequency division multiplexing ("OFDM") modulating and transmitting predetermined information to run processing the processing comprising:

an input step of inputting a window signal and a clock signal serving as a reference;

a modulation step of modulating an OFDM signal in accordance with the information by using the window signal and the clock signal input at the input step;

a generation step of generating a predetermined radio frequency ("RF") signal in accordance with the window signal; and a frequency conversion step of converting frequencies of the OFDM signal based on the RF signal so that a carrier interval between adjacent channels becomes a whole multiple of the interval between carriers adjacent to each other within a channel.

* * * * *

UNITED STATES PATENT AND TRADEMARK OFFICE
CERTIFICATE OF CORRECTION

| | | |
|---|---|---|
| PATENT NO. | : 7,158,475 B1 | Page 1 of 1 |
| APPLICATION NO. | : 09/936337 | |
| DATED | : January 2, 2007 | |
| INVENTOR(S) | : Yasunari Ikeda et al. | |

It is certified that error appears in the above-identified patent and that said Letters Patent is hereby corrected as shown below:

In claim 9, column 10, line 46, " processing the" should read --processing, the--.

Signed and Sealed this

Twenty-second Day of May, 2007

JON W. DUDAS
*Director of the United States Patent and Trademark Office*